(12) United States Patent
Seo et al.

(10) Patent No.: US 12,510,784 B2
(45) Date of Patent: Dec. 30, 2025

(54) BACKLIGHT UNIT AND DISPLAY DEVICE INCLUDING THE SAME

(71) Applicant: LG Display Co., Ltd., Seoul (KR)

(72) Inventors: Jeongho Seo, Paju-si (KR); Kiduck Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/987,984

(22) Filed: Dec. 19, 2024

(65) Prior Publication Data

US 2025/0216719 A1    Jul. 3, 2025

(30) Foreign Application Priority Data

Dec. 28, 2023  (KR) .......................... 10-2023-0194794

(51) Int. Cl.
*G02F 1/00*      (2006.01)
*G02F 1/13357*   (2006.01)

(52) U.S. Cl.
CPC .. *G02F 1/133608* (2013.01); *G02F 1/133603* (2013.01); *G02F 1/133605* (2013.01); *G02F 1/133606* (2013.01)

(58) Field of Classification Search
None
See application file for complete search history.

(56) References Cited

U.S. PATENT DOCUMENTS

| | | | |
|---|---|---|---|
| 10,761,370 B2 | 9/2020 | Park | |
| 2011/0096265 A1* | 4/2011 | Murakoshi | G02F 1/133605 349/64 |
| 2015/0211715 A1* | 7/2015 | Song | G02F 1/1336 362/97.3 |
| 2016/0061414 A1* | 3/2016 | Song | G02F 1/133603 362/97.1 |
| 2017/0219881 A1* | 8/2017 | Shin | G02F 1/133608 |
| 2018/0217449 A1* | 8/2018 | Mifune | G02F 1/133605 |
| 2019/0137826 A1 | 5/2019 | Park | |
| 2020/0166804 A1* | 5/2020 | Zheng | G02F 1/133608 |

FOREIGN PATENT DOCUMENTS

| | | |
|---|---|---|
| KR | 10-2010380 B1 | 8/2019 |
| KR | 10-2020933 B1 | 9/2019 |

* cited by examiner

*Primary Examiner* — Gerald J Sufleta, II
(74) *Attorney, Agent, or Firm* — Fenwick & West LLP

(57) ABSTRACT

Disclosed is a backlight unit in which a PCB and a lens are prevented from lifting off from an edge of a reflective plate and are fixed to the reflective plate when manufacturing an LED array. Further, the display device including the same is provided. To this end, the backlight unit is configured such that the lenes disposed on the PCB and arranged so as to be spaced from each other are fixedly inserted into openings defined in the reflective plate, wherein the openings defined in different areas of the reflective plate have different shapes and widths.

17 Claims, 11 Drawing Sheets

BACKLIGHT UNIT AND DISPLAY DEVICE INCLUDING THE SAME

CROSS-REFERENCE TO RELATED APPLICATION

This application claims priority from Republic of Korea Patent Application No. 10-2023-0194794 filed on Dec. 28, 2023, which is hereby incorporated by reference in its entirety.

BACKGROUND

Field

The present disclosure relates to a backlight unit and a display device including the same.

Description of Related Art

In general, a flat display device has the advantages of high definition, ultra-thinness, lightness, and large area, and has advantages in terms of space utilization, interior design, and design, and may have various application fields.

Recently, a curved display device in which a flat display device has a curved surface, is rapidly emerging as a next-generation display device. The curved display device may improve user immersion and make an image more realistic, thereby allowing a user to feel comfortable or have a wider viewing radius than that of the flat display device.

Since a liquid crystal panel does not have its own light-emitting element, this curved display device including the liquid crystal panel requires a separate light source to display an image based on a difference in transmittance of light. To this end, a backlight unit with a light source built therein is disposed on a back surface of the liquid crystal panel.

In this regard, the backlight units are classified into a direct type and an edge type based on an arrangement structure of the light source. The edge type has a structure in which one or a pair of light sources is disposed on one side of a light guide plate and two or two pairs of light sources are respectively disposed on both opposing sides of the light guide plate. The direct type has a structure in which several light sources are disposed under the liquid crystal panel.

The direct type backlight unit is thicker than the edge type back light unit, and thus is mainly used in a liquid crystal display device where brightness is more important than a thickness of the device. The edge type backlight unit which is lighter and thinner than the direct type backlight unit is mainly used in the liquid crystal display device where the thickness is more important than the brightness such as a display device for a laptop PC and a monitor PC.

SUMMARY

The direct type backlight unit has a structure in which each light-emitting diode (LED) as a light source is disposed inside each lens, and the lenses are disposed on a printed circuit board (PCB) and are arranged so as to be spaced from each other by an equal spacing.

However, in the direct type backlight unit, when manufacturing a LED array, the PCB on which the lens is mounted is fixed to a reflective plate while a PCB width and a lens width are equal to each other. Thus, the lens lifts off from an edge of the reflective plate in a high temperature or high temperature and high humidity environment.

Therefore, there is a problem in that a screen quality of the display device deteriorates as the lens lifts off from the edge of the reflective plate fixed to a bottom chassis.

Accordingly, in order to solve the above-mentioned problem, the inventor of the present disclosure has invented a backlight unit in which the PCB and the lens are prevented from lifting off from the edge of the reflective plate and are fixed to the reflective plate when manufacturing an LED array, and a display device including the same.

Therefore, a purpose of the present disclosure is to provide a backlight unit in which the lenes disposed on the PCB and arranged so as to be spaced from each other are fixedly inserted into openings defined in the reflective plate, wherein the openings defined in different areas of the reflective plate have different shapes and widths, and is to provide a display device including the same.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A backlight unit according to an embodiment of the present disclosure may be provided. The backlight unit includes a printed circuit board; at least one lens disposed on the printed circuit board; and a reflective plate having at least one opening defined therein in a corresponding manner the at least one lens, wherein the reflective plate is disposed on the printed circuit board so that each lens is inserted into each opening, wherein at least one opening includes: a first opening located at one side edge of both opposing side edges in a first direction of the reflective plate; a second opening located at the other side edge of both opposing side edges in a first direction of the reflective plate; and at least one third opening located between the first opening and the second opening.

In accordance with some embodiments of the backlight unit, in a plan view of the backlight unit, each of the first to third openings has one side edge portion, the other side edge portion, and a middle portion disposed therebetween, wherein a width in a second direction of the one side edge portion of the first opening is smaller than a width in the second direction of each of the other side edge portion and the middle portion of the first opening, wherein the second direction interests with the first direction, wherein a width in the second direction of the other side edge portion of the second opening is smaller than a width in the second direction of each of the one side edge portion and the middle portion of the second opening, wherein a width in the second direction of the middle portion of the third opening is smaller than a width in the second direction of each of the one side edge portion and the other edge portion of the third opening.

In accordance with some embodiments of the backlight unit, in a plan view of the backlight unit, the first opening, the second opening, and the third opening have different shapes from each other.

In accordance with some embodiments of the backlight unit, in a plan view of the backlight unit, a shape of the first opening and a shape of the second opening are symmetrical with each other around a center in the first direction of the reflective plate.

In accordance with some embodiments of the backlight unit, the lenes are disposed on the printed circuit board and are arranged so as to be spaced from each other by an equal spacing along the first direction.

In accordance with some embodiments of the backlight unit, a width in a second direction of each of the at least one lens is larger than a width in the second direction of the printed circuit board, wherein the second direction intersects the first direction.

In accordance with some embodiments of the backlight unit, each lens receives therein each light-emitting diode (LED).

In accordance with some embodiments of the backlight unit, the backlight unit further comprises a reinforcement frame accommodating therein the reflective plate into which the at least one lens disposed on the printed circuit board is inserted.

In accordance with some embodiments of the backlight unit, a diffuser sheet is disposed on the reflective plate, wherein at least one optical sheet is disposed on the diffuser sheet.

A display device according to an embodiment of the present disclosure may be provided. The display device includes a backlight unit; and a display panel disposed on the backlight unit, wherein the backlight unit includes a printed circuit board; at least one lens disposed on the printed circuit board; and a reflective plate having at least one opening defined therein in a corresponding manner the at least one lens, wherein the reflective plate is disposed on the printed circuit board so that each lens is inserted into each opening, wherein at least one opening includes: a first opening located at one side edge of both opposing side edges in a first direction of the reflective plate; a second opening located at the other side edge thereof; and at least one third opening located between the first opening and the second opening. In this regard, each of the backlight unit and the display panel may be curved at a predetermined curvature.

In accordance with some embodiments of the display device, the backlight unit further includes a reinforcement frame accommodating therein the reflective plate into which the at least one lens disposed on the printed circuit board is inserted, wherein the reinforcement frame includes four side walls coupled to each other to define an accommodation space of a rectangular shape in a plan view of the display device, wherein the four side walls extend upwardly and respectively from four side edges of a bottom surface of the reinforcement frame.

In accordance with some embodiments of the display device, a height from the bottom surface of each of the first sidewall and the second sidewall facing each other is larger in each of both opposing side edges thereof than in a center thereof, wherein a lower surface of each of the first and second sidewalls is curved to have a first curvature having a value greater than 0, wherein an upper surface of each of the first and second sidewalls is curved to have a second curvature greater than the first curvature.

In accordance with some embodiments of the display device, the reflective plate includes: a first protrusion protruding into the third opening from one of both opposing sides in the second direction of the third opening in a middle area in the first direction of the third opening; and a first protrusion protruding into the third opening from the other of the both opposing sides in the second direction of the third opening in the middle area in the first direction of the third opening.

According to an embodiment of the present disclosure, each of a pair of curved reinforcement bars of the reinforcement frame which serves to maintain the curvature of the display device is formed to have a step structure in a direction perpendicular to the longitudinal direction thereof. Thus, even when the printed circuit board is connected to the display panel through a connection member having a short length, the printed circuit board may be bent so as to be adhered to a back surface of the display device.

Therefore, a process cost may be reduced, compared to a conventional scheme in which the printed circuit board is connected to the display panel through the connection member having a length varying depending on a structure of the backlight unit. This may improve the efficiency of the process.

Furthermore, as the curved reinforcement bar which plays a role in maintaining the overall curvature of the display device is formed to have a predetermined strength, a predetermined rigidity of the display device may be maintained.

Furthermore, according to an embodiment of the present disclosure, light leakage may be prevented from occurring at the edge of the display pane of the display device.

Therefore, light leakage from the image displayed through the display panel may be prevented, such that the quality of the image displayed through the display panel may be improved.

Furthermore, in the backlight unit according to the present disclosure, an optical distance is larger in an edge thereof than in a center thereof. Thus, a dark defect may be prevented from occurring in the edge area of the display panel.

Furthermore, in the backlight unit according to the present disclosure embodied as the direct type backlight unit, the PCB and the lens are fixed to the reflective plate while the PCB width and the lens width are different from each other when manufacturing the LED array. Thus, the PCB and the lens may be prevented from lifting off from the edge of the reflective plate in a high temperature or high temperature and high humidity environment.

Furthermore, in the backlight unit according to an embodiment of the present disclosure, an optical distance is larger in an edge thereof than in a center thereof. Thus, the number of light sources in the edge area may be reduced such that a production cost may be reduced.

Effects of the present disclosure are not limited to the effects mentioned above, and other effects not mentioned will be clearly understood by those skilled in the art from the description below.

In addition to the above effects, specific effects of the present disclosure are described together while describing specific details for carrying out the present disclosure.

DETAILED DESCRIPTION

Figure 1:
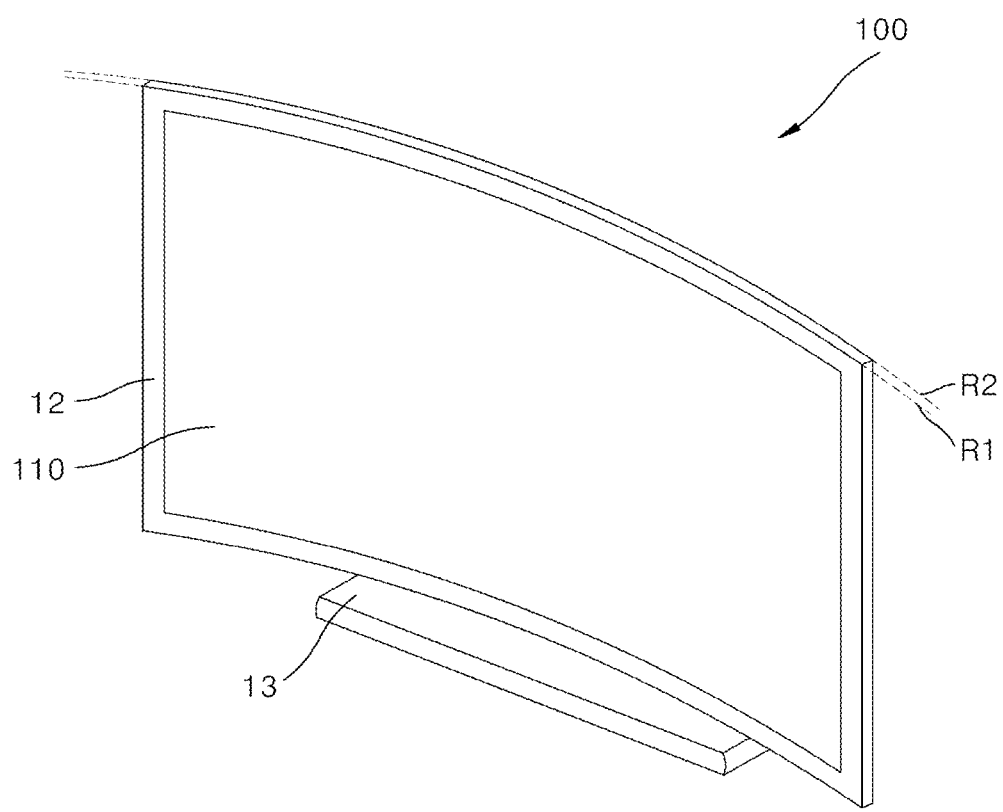
FIG. 1 is a perspective view schematically showing a display device according to an embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for illustrating embodiments of the present disclosure are illustrative, and the present disclosure is not limited thereto.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of associated listed items. Expression such as "at least one of" when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment may be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or periods, these elements, components, regions, layers and/or periods should not be limited by these terms. These terms are used to distinguish one element, component, region, layer or section from another element, component, region, layer or period. Thus, a first element, component, region, layer or section as described under could be termed a second element, component, region, layer or period, without departing from the spirit and scope of the present disclosure.

When an embodiment may be implemented differently, functions or operations specified within a specific block may be performed in a different order from an order specified in a flowchart. For example, two consecutive blocks may actually be performed substantially simultaneously, or the blocks may be performed in a reverse order depending on related functions or operations.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "embodiments," "examples," "aspects, and the like should not be construed such that any aspect or design as described is superior to or advantageous over other aspects or designs.

Further, the term 'or' means 'inclusive or' rather than 'exclusive or'. That is, unless otherwise stated or clear from the context, the expression that 'x uses a or b' means any one of natural inclusive permutations.

The terms used in the description below have been selected as being general and universal in the related technical field. However, there may be other terms than the terms depending on the development and/or change of technology, convention, preference of technicians, etc. Therefore, the terms used in the description below should not be understood as limiting technical ideas, but should be understood as examples of the terms for illustrating embodiments.

Further, in a specific case, a term may be arbitrarily selected by the applicant, and in this case, the detailed meaning thereof will be described in a corresponding description period. Therefore, the terms used in the description below should be understood based on not simply the name of the terms, but the meaning of the terms and the contents throughout the Detailed Descriptions.

In description of flow of a signal, for example, when a signal is delivered from a node A to a node B, this may include a case where the signal is transferred from the node A to the node B through another node unless a phrase 'immediately transferred' or 'directly transferred' is used.

Throughout the present disclosure, "A and/or B" means A, B, or A and B, unless otherwise specified, and "C to D" means C inclusive to D inclusive unless otherwise specified.

"At least one" should be understood to include any combination of one or more of listed components. For example, at least one of first, second, and third components means not only a first, second, or third component, but also all combinations of two or more of the first, second, and third components.

Hereinafter, embodiments of the present disclosure will be described using the attached drawings. A scale of each of components as shown in the drawings is different from an actual scale thereof for convenience of illustration, and therefore, the present disclosure not limited to the scale as shown in the drawings.

Hereinafter, a backlight unit and a display device including the same according to an embodiment of the present disclosure will be described.

Figure 2:
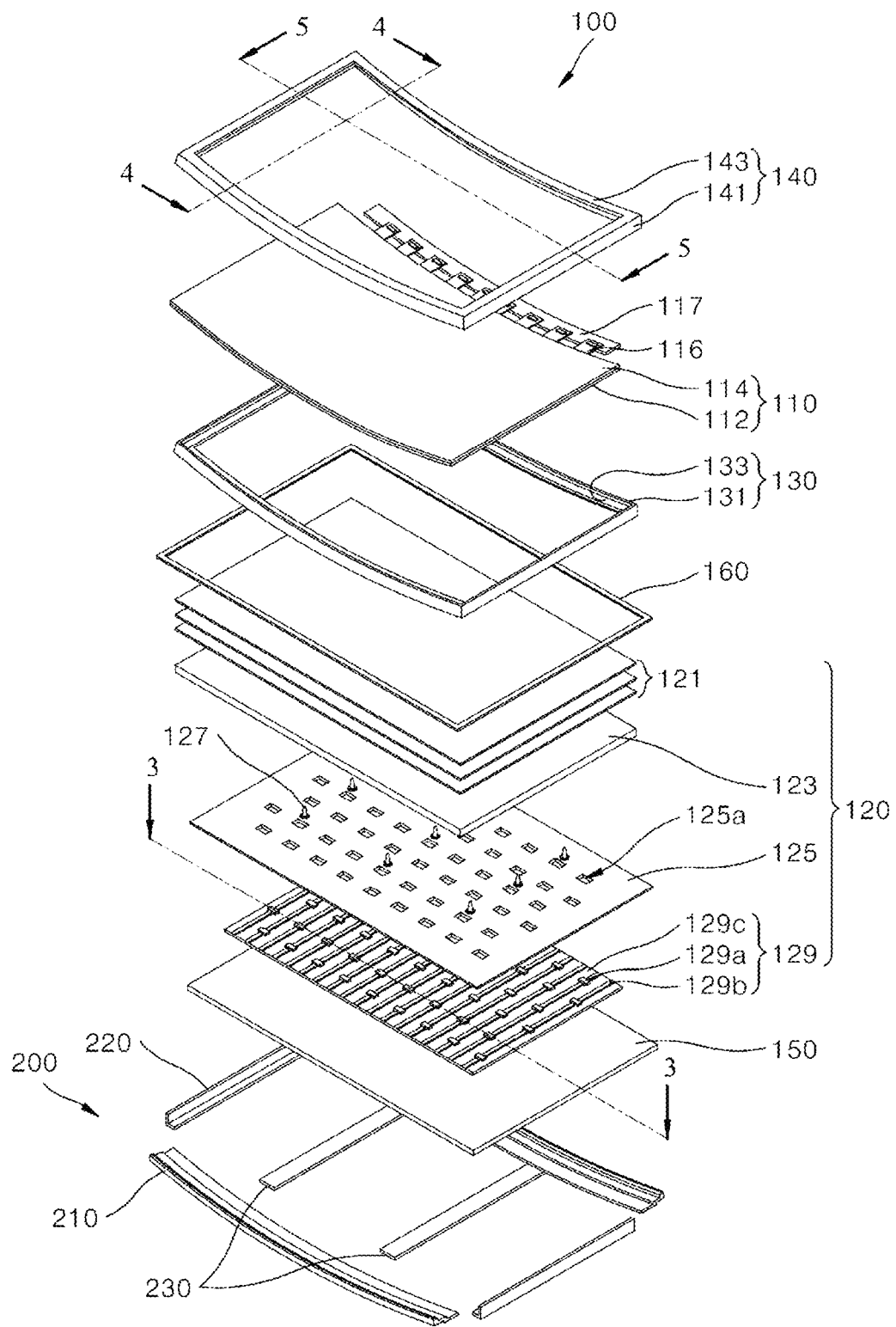
FIG. 2 is an exploded perspective view schematically showing a display device according to an embodiment of the present disclosure.

FIG. 1 is a perspective view schematically showing a display device according to an embodiment of the present disclosure, and FIG. 2 is an exploded perspective view schematically showing a display device according to an embodiment of the present disclosure.

Referring to FIG. 1 and FIG. 2, the display device 100 according to an embodiment of the present disclosure may include a display panel 110 for displaying an image, an outer casing 12 for accommodating the display panel 110 therein, and a stand 13 connected to a lower end or a back surface of the outer casing 12.

The display device 100 according to an embodiment of the present disclosure may be a curved liquid crystal display device including the display panel 110 having a curved shape of a predetermined curvature R1 and R2.

The display panel 110 plays a key role in image display, and may include a first substrate 112 and a second substrate 114 that face each other and are bonded to each other while a liquid crystal layer (not shown) is disposed therebetween. That is, in one embodiment of the present disclosure, the display panel 110 may include a liquid crystal display panel including the first substrate 112, the second substrate 114 facing the first substrate 112, and the liquid crystal layer (not shown) disposed therebetween. Hereinafter, the liquid crystal panel 110 will be referred to as the display panel 110.

In a XY plane, the display panel 110 may have a curved shape with the predetermined curvature R1 and R2. Each of the first substrate 112 and the second substrate 114 is curved to have each of the predetermined curvatures R1 and R2. The first substrate 112 located inwardly based on a center of the radius of curvature and the second substrate 114 located outwardly based on the center of the radius of curvature are curved to have the same radius of curvature (R1=R2). In this regard, the center of the radius of curvature in a horizontal direction is located outwardly of the first substrate 112, that is, on a side where an observer is located.

The display panel 110 operates in a convex curved mode in which a front surface is convexly curved such that the viewer has a wide viewing radius. Thus, the display device may deliver news, advertisements, etc. to the viewer through an image displayed on the display panel.

The display panel 110 may be curved before being inserted into a curved top cover 140 which is curved to have a predetermined curvature, or may be curved after being inserted into the curved top cover 140. For example, when the display panel 110 is of a flexible type, the display panel may be curved after being inserted into the curved top cover 140. When the display panel 110 is of a rigid type, the display panel may be manufactured to have a curved shape with a predetermined curvature before being inserted into the curved top cover 140.

The display panel 110 may be modularized using a back cover and a cover window. The back cover has a shape that covers a back surface and a portion of a side surface of the display panel and may be constructed to have a front surface open to display an image displayed on the display panel. The cover window that may protect the display panel may be assembled and fastened to the open front surface of the back cover.

Referring to FIG. 2, the display device 100 according to an embodiment of the present disclosure may include the display panel 110, a backlight unit 120, a curved guide panel 130, a curved top cover 140, a cover bottom 150, an optical guide frame 160, and a reinforcement frame 200 for modularizing the display panel 110 and the backlight unit 120 with each other.

The display panel 110 may include the first substrate 112 and the second substrate 114 that are curved to have the predetermined curvatures R1 and R2, respectively.

The first substrate 112 may include a transparent insulating substrate such as glass and a plurality of thin-film transistors, data lines, gate lines, pixel electrodes, etc. formed thereon. The data line is connected to a source terminal of the thin-film transistor, and the gate line is connected to a gate terminal thereof. A pixel electrode made of a transparent conductive material such as indium tin oxide (ITO) is connected to a drain terminal of the thin-film transistor.

The second substrate 114 opposite to the first substrate 112 may include a transparent insulating substrate, and a color filter and a common electrode, etc. formed thereon. The color filter may include color filters that may respectively render primary colors such as red, green, and blue colors. The common electrode is made of a transparent conductive material such as indium tin oxide (ITO) or indium zinc oxide (IZO). At least one of the color filter and the common electrode may be located in the lower substrate 112.

A polarizer may be attached to each of the first substrate 112 and the second substrate 114. The polarizer may polarize light incident on the liquid crystal display panel and thus transmit only light that vibrates in one direction therethrough.

In the liquid crystal display panel, when the thin-film transistor is turned on based on a signal applied to the gate line, a signal applied to the data line is applied to the pixel electrode. Then, an electric field of a predetermined magnitude is generated between the pixel electrode and the common electrode to control the orientation of the liquid crystal molecules in the liquid crystal layer. As a result, the transmittance of light passing through the liquid crystal layer is adjusted to display the image.

The display device 100 may include at least one driving device (not shown) such as a driver or a controller that controls signals applied to the display panel 110. The driving device may be mounted on the display panel 110 in a form of an integrated circuit chip, or may be mounted on a printed circuit board (PCB) or flexible printed circuit board (FPCB) and electrically connected to the display panel 110. In another example, the driving device may be integrated into the display panel 110.

The backlight unit 120 may be located under the display panel 110 to provide light to the display panel 110. In this regard, the backlight unit 120 may be a curved backlight unit 120 with a predetermined curvature. The curved backlight unit 120 is of a direct type and provides light to the display panel 110.

In FIG. 2, a direction on the drawing is defined for convenience of illustration. under the premise that a display surface of the display panel 110 faces in a frontward direction, the optical guide frame 160 is disposed in rear of the display panel 110 while surrounding an edge of the backlight unit 120. While the curved guide panel 130 in a shape of a rectangular frame surrounds an outer area of the above components, the curved top cover 140 is located in front of the display panel 110. The cover bottom 150 is located on a back surface of the backlight unit 120. In this way, the above components are joined and integrated with each other.

The reinforcing frame 200 is located on a back surface of the cover bottom 150 to support an entire back surface of the display device 100.

In this regard, under the premise that the display panel 110 is of an active matrix type, although it is not clearly shown in the drawing, a plurality of gate lines and data lines are disposed on an inner surface of the first substrate 112 which is usually referred to as a lower substrate or an array substrate and intersect each other to define pixel areas. The thin-film transistor TFT is disposed at each intersection and is connected in one-to-one correspondence to the transparent pixel electrode formed in each pixel.

Further, the color filters of, for example, red R, green G, and blue B colors corresponding to the pixels, and a black matrix surrounding each of the color filters and screening non-display elements such as the gate lines, the data lines, and the thin-film transistors are disposed on an inner surface of the second substrate 114 referred to as an upper substrate or a color filter substrate in the display panel 110. Furthermore, a transparent common electrode may be provided to cover the above component.

A flexible printed circuit board (FPCB) is connected to at least one edge of the display panel 110 through a connection member 116 such as a flexible printed circuit board, and is bent toward a back surface of the reinforcement frame 200 during the modularization process.

In addition, although not clearly shown in the drawing, upper and lower alignment films (not shown) that control the initial molecular orientation of the liquid crystal are respectively interposed between the two substrates 112 and 114 of the display panel 110 and the liquid crystal layer. A seal pattern may be formed along an edge of each of both substrates 112 and 114 to prevent leakage the liquid crystal from the liquid crystal layer disposed between the upper and lower alignment films (not shown).

In this regard, first and second polarizers 119a and 119b (see FIG. 4) may be attached to outer surfaces of the first and second substrates 112 and 114, respectively.

This display panel 110 may be constructed to have a predetermined curvature, and has a concavely curved display surface where an image is displayed.

Further, the backlight unit 120 that supplies light is disposed on the back surface of the display panel 110 so that the image is displayed based on variation in transmittance of the light emitted therefrom.

The backlight unit 120 may be located on the back surface of the display panel 110, and may include a light source module 129, a reflective plate 125, a diffuser plate 123 disposed on top of the light source module 129 and spaced therefrom through a guide support 127, and an optical sheet 121 positioned on top of the diffuser plate 123.

The light source module 129 is a light source of the backlight unit 120, and may include a PCB 129b seated on an inner surface of the cover bottom 150 and a plurality of lenses 129a arranged on the PCB 129b and spaced from each other. One lens 129a may contain therein one LED. The LED may include, for example, an organic light-emitting element, a micro LED element, or a micro LED chip.

In this regard, in order to improve luminous efficiency and luminance, the LED may employ a blue LED including a blue LED chip with excellent luminous efficiency and luminance. The lens may contain therein yttrium aluminum garnet (YAG:Ce) doped with cerium as a fluorescent material, i.e. a yellow fluorescent material.

The blue light emitted from the blue LED passes through the fluorescent material and is mixed with the yellow light emitted from the fluorescent material, thereby emitting white light toward the diffuser plate 123.

The reflective plate 125 is formed to have a plurality of through-holes 125h through which a plurality of lenses 129a may be inserted. The reflective plate 125 may cover an entirety of a horizontal surface of each of the PCB 129b and the cover bottom 150 excluding the multiple lenses 129a. Thus, the reflective plate 125 may reflect the light directed to the back surface of each lens 129a therefrom toward the diffuser plate 123 such that the luminance of the light is improved.

The diffuser plate 123 and the optical sheet 121 are disposed on top of the lens 129a exposed through the through-hole 125h of the reflective plate 125 for uniformity of luminance.

In this regard, the diffuser plate 123 and the optical sheet 121 are supported by the guide support 127 to prevent or at least reduce sagging thereof. The optical sheet 121 may include a diffuser sheet and at least one light condensing sheet. Thus, the light having passed through the diffuser plate 123 is diffused or condensed by the optical sheet so that more uniform surface light is incident on the display panel 110.

Therefore, while the light emitted from the multiple lenses 129a of the light source module 129 sequentially travels through the diffuser plate 123 and the optical sheet 121, the light is converted into uniform and high-quality light, which in turn is incident into the display panel 110. Using this light, the display panel 110 displays a high-luminance image to the outside.

This display panel 110 and the backlight unit 120 may be modularized with each other using the optical guide frame 160, the curved guide panel 130, the cover bottom 150, the curved top cover 140, and the reinforcement frame 200.

The curved top cover 140 has a rectangular frame shape with a bent cross section to cover an edge of an upper surface and a side surface of the display panel 110, and may include a first edge portion 141 covering the side surface of the display panel 110, and a second edge portion 143 that is bent in a perpendicular manner to the first edge portion so as to cover the edge of the upper surface of the display panel 110.

A front surface of the curved top cover 140 is opened to display the image displayed on the display panel 110 therethrough, and the curved top cover 140 is bent to have a curvature corresponding to the curvature of the display panel 110.

The optical guide frame 160 has a rectangular frame shape surrounding an edge of the optical sheet 121 of the backlight unit 120. The optical guide frame 160 has a protrusion 161 (see FIG. 4) for fixing the optical sheet 121. A protrusion receive groove (121a, see FIG. 4) is defined in a corresponding manner to the protrusion (161 see FIG. 4), and extend along an edge of the optical sheet 121.

The curved guide panel 130 supports the edge of the display panel 110 and has a rectangular frame shape to surround an edge of each of the backlight unit 120 and the optical sheet 121 whose the edge is surrounded with the optical guide frame 160.

This curved guide panel 130 has a third edge portion 131 surrounding a side surface of each of the optical guide frame 160 and the backlight unit 120, and a fourth edge portion 133 bent inwardly from the third edge portion so as to distinguish positions of the display panel 110 and the backlight unit 120 from each other.

The display panel 110 is attached and fixed to the fourth edge portion 133 through an adhesive pad (not shown) such as double-sided tape.

This curved guide panel 130 is curved to have a curvature corresponding to the curvature of the display panel 110.

Furthermore, the cover bottom 150 on which the display panel 110 and the backlight unit 120 are seated and which serves as a basis for assembly of the components of the display device 100 has a plate shape including a horizontal plane.

The reinforcing frame 200 is located on a back surface of the cover bottom 150, and the reinforcing frame 200 serves to maintain an overall curvature of the display device 100.

This reinforcement frame 200 may include a pair of curved reinforcement bars 210 opposite to each other and extending along a longitudinal direction of the display device 100, and a pair of side frames 220 and a center frame 230 extending in a perpendicular manner to the length direction of the curved reinforcement bars 210.

The pair of curved reinforcement bars 210 have a bar shape extending along the longitudinal direction of the cover bottom 150, and are spaced from each other, and are disposed respectively on both opposing side edges in a perpendicular direction to the longitudinal direction of the cover bottom 150. The pair of curved reinforcement bars 210 extend along the longitudinal direction of the cover bottom 150.

This pair of curved reinforcement bars 210 are curved to have a predetermined curvature to correspond to the curvature of the display panel 110.

The pair of side frames 220 extending in the perpendicular manner to the length direction of the pair of curved reinforcement bars 210 may be formed in a bar shape extending in a short side direction perpendicular to the longitudinal direction of the cover bottom 150. The pair of side frames 220 are spaced apart from each other in the longitudinal direction of the cover bottom 150.

Each of the pair of side frames 220 connects respective ends of the pair of curved reinforcement bars 210 facing each other to each other.

The center frame 230 extends in a manner perpendicular to the length direction of the pair of curved reinforcement bars 210 and is positioned in an area corresponding to a middle area in the length direction of each of the pair of curved reinforcement bars 210. At least two center frames 230 may be arranged along the longitudinal direction of the curved reinforcement bar 210 to support a middle area of the back surface of the cover bottom 150.

The curved guide panel 130, the cover bottom 150, the optical guide frame 160, the curved top cover 140, and the reinforcement frame 200 may be coupled to each other into an integrated module such that the edge of the display panel 110 and the edge of the backlight unit 120 including the optical guide frame 160 surrounding the edge of the optical sheet 121 are surrounded with the curved guide panel 130, and the pair of curved reinforcement bars 210 and the pair of side frames 220 of the reinforcement frame 200 surround a side surface of the cover bottom 150, and the curved top cover 140 covers the edge of the upper surface and the side surface of the display panel 110, and the cover bottom 150 covers the back surface of the backlight unit 120.

In this regard, the curved top cover 140 is also referred to as 'curved case top' or 'curved top case', and the curved guide panel 130 is referred to as 'curved support main' or 'curved main support' or 'mold frame'. Also, the cover bottom 150 is also referred to as a 'cover bottom' or 'lower cover'.

In this regard, in the display device 100 according to an embodiment of the present disclosure, a pair of curved reinforcement bars 210 have respective step structures facing each other.

Thus, in the display device 100 according to an embodiment of the present disclosure, although the connection member 116 connecting the printed circuit board 117 to one edge of the display panel 110 has a small length, the printed circuit board 117 may be easily bent and adhered to the back surface of the reinforcement frame 200.

Thus, in the display device 100 according to an embodiment of the present disclosure, even when the backlight unit 120 is embodied as an edge-type backlight unit rather than a direct-type backlight unit, the connection member 116 having the small length may connect the printed circuit board 117 to one side edge of the display panel 110.

Thus, a decrease in process efficiency, such as increased process cost may be prevented or at least reduced. Furthermore, light leakage may be prevented or at least reduced from occurring at an edge of the display panel, making it possible to implement the display device 100 that display a high-quality image.

The backlight unit 120 is located under the display panel 110 to provide light to the display panel 110. The backlight unit 120 according to an embodiment of the present disclosure is a curved backlight unit with a predetermined curvature, and may provide light to the display panel 110.

Figure 3:
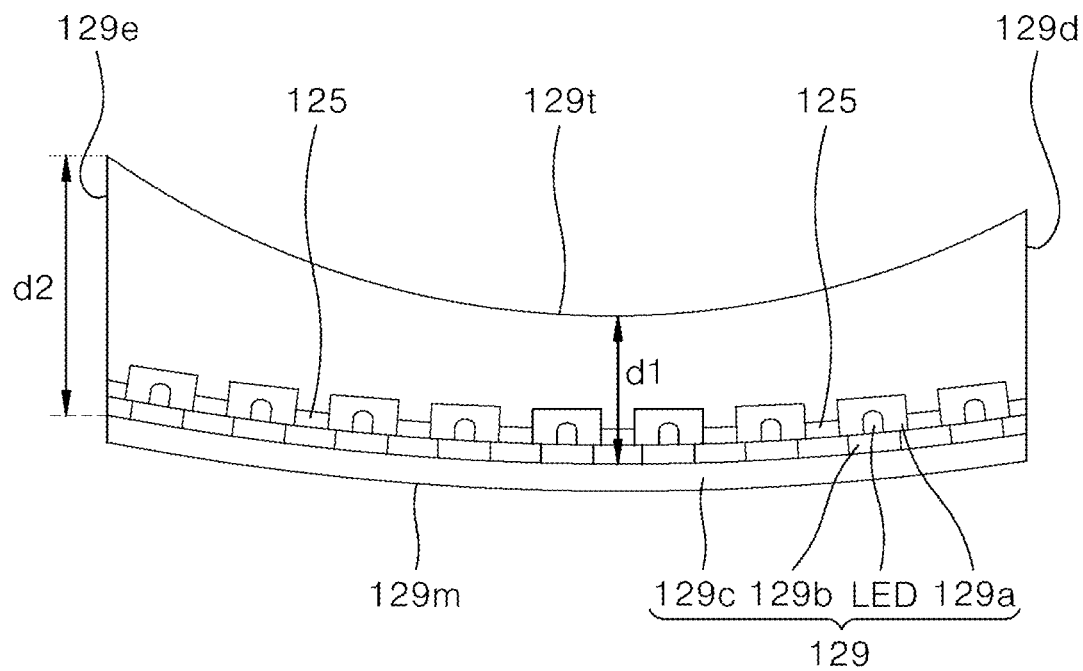
FIG. 3 is a cross-sectional view cut along a cutting line 3-3 in FIG. 2 in a state in which a light source module along with a reflective plate is mounted on a reinforcing frame according to an embodiment of the present disclosure.

FIG. 3 is a cross-sectional view cut along a cutting line 3-3 in FIG. 2 in a state in which when the light source module 129 together with the reflective plate 125 is mounted on the reinforcement frame 200 according to an embodiment of the present disclosure.

Referring to FIG. 3, the light source module 129 according to an embodiment of the present disclosure may include a bottom portion 129c, the printed circuit boards (PCBs) 129b disposed on the bottom portion 129c, and spaced from each other, and the lenses 129a disposed on each PCB 129b. The reflective plate 125 may be disposed on the PCBs 129b.

Furthermore, the light source module 129 may include a third sidewall 129e and a fourth sidewall 129d extending upwardly from the bottom portion 129c.

The light source module 129 shown in FIG. 3 is a cross-sectional view cut along the cutting line 3-3 in FIG. 2 parallel to the X axis, so the first sidewall and the second sidewall are (not shown), and the first sidewall and only the upper side 129t and lower side 129m of the second sidewall are shown.

The third sidewall 129e and the fourth sidewall 129d face each other, and a first sidewall and a second sidewall (not shown) face each other.

More specifically, the first sidewall and the second sidewall face each other in a Y-axis direction and extend in an X-axis direction, while the third sidewall 129e and the fourth sidewall 129d face each other in the X-axis direction and extend in the Y-axis direction. In this regard, the first sidewall and the second sidewall are formed to be concavely curved with a predetermined curvature when observed in the Z direction, that is, in the XY plane, while the third sidewall 129e and the fourth sidewall 129d may be flat without being curved.

An upper surface 129t of each of the first sidewall and the second sidewall may be concavely curved to have a first curvature R1, while a lower surface 129m of each of the first sidewall and the second sidewall may be concavely curved to have a second curvature R2. In this regard, the first curvature R1 may be larger than the second curvature R2.

That is, a height d1 from the bottom portion 129c to the upper surface 129t of each of the first sidewall and the second sidewall may be larger at an outer area of the backlight unit 120 than that d1 in a center thereof.

The LED of the light source module 129 is disposed on the bottom portion 129c, and a travel distance of light from the LED of the light source module 129 may be larger at the outer area of the backlight unit 120 than that in the center thereof.

The third sidewall 129e and the fourth sidewall 129d may be formed to have a constant height from the bottom portion 129m. In an embodiment of the present disclosure, an example in which the first sidewall and the second sidewall are formed to be concavely curved with a predetermined curvature when observed in the Z direction, that is, on the XY plane, while the third sidewall 129e and the fourth sidewall 129d are formed to be flat without being curved is described. However, embodiments of the present disclosure are not limited thereto. For example, the third sidewall 129e and the fourth sidewall 129d are formed to be concavely curved with a predetermined curvature when observed in the Z direction, that is, on the XY plane, while the first sidewall and the second sidewall may be formed to be flat without being curved.

Figure 4:
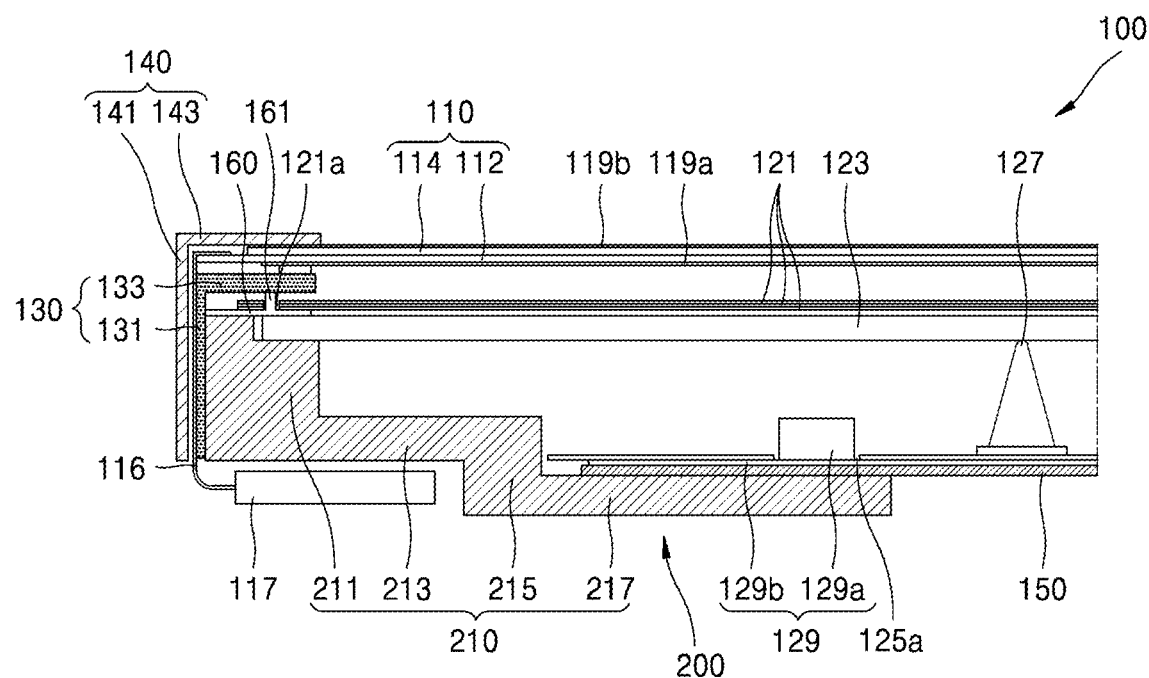
FIG. 4 is a cross-sectional view cut along a cutting line 4-4 in FIG. 2 in the display device according to an embodiment of the present disclosure.

FIG. 4 is a cross-sectional view cut along a cutting line 4-4 in FIG. 2 in the display device according to an embodiment of the present disclosure.

Referring to FIG. 4, in the display device 100 according to an embodiment of the present disclosure, the reinforcement frame 200 may include the curved reinforcement bars 210 facing each other in the Z-axis direction and the side frames 220 facing each other in the X-axis direction.

The curved reinforcement bar 210 serves to maintain the overall curvature of the display device 100, and has a predetermined curvature to correspond to the curvature of the display panel 110. For example, the curved reinforcing bar 210 may include a metallic material having a relatively high rigidity such as aluminum (Al), stainless steel (SUS), hot dip galvanized iron (HGI) and electrolytically galvanized iron (EGI).

The curved reinforcing bar 210 may have a bar shape corresponding to a longitudinal direction of the cover bottom 150 (of FIG. 2). For example, the curved reinforcing bar 210 may include a first vertical portion 211, a first horizontal portion 213 perpendicularly bent from an end of the first vertical portion 211, a second vertical portion 215 perpendicularly bent from an end of the first horizontal portion 213 and a second horizontal portion 217 perpendicularly bent from an end of the second vertical portion 215.

As a result, the curved reinforcing bar 210 has a stepped shape where the first and second vertical portions 211 and 215 are spaced apart from each other in a cross-sectional view. The first vertical portion 211 may have a guide portion 219 on a top surface thereof to support the edge portion of the diffuser plate 123 (of FIG. 2).

The pair of curved reinforcing bars 210 may be disposed along both long sides of the cover bottom 150 and spaced apart from each other. As a result, the pair of curved reinforcing bars 210 may have a stepped shape along an opposing direction to supply space for the printed circuit board (PCB) 117. Since the first and second vertical portions 211 and 215 and the first and second horizontal portions 213 and 217 have a uniform thickness, the first and second vertical portions 211 and 215 and the first and second horizontal portions 213 and 217 supply space for the printed circuit board (PCB) 117 under the rear surface of the curved reinforcing bar 210 with a relatively high rigidity.

Since the first horizontal portion 213 is perpendicularly bent from an end of the first vertical portion 211 and the second vertical portion 215 is perpendicularly bent from an end of the first horizontal portion 213, a rear surface of the first horizontal portion 213 and an outer side surface of the second vertical portion 215 constitute a step. The printed circuit board (PCB) 117 connected to the liquid crystal panel 110 through the connecting member 116 is inserted into the space created by the step and is disposed to contact the rear surface of the curved reinforcing bar 210 by bending the connecting member 116.

Since a distance between the front surface of the liquid crystal panel 110 and the rear surface of the first horizontal portion 213 of the curved reinforcing bar 210 is smaller than a distance between the front surface of the liquid crystal panel 110 and the rear surface of the second horizontal portion 217 of the curved reinforcing bar 210, the printed circuit board (PCB) 117 connected to the liquid crystal panel 110 through the connecting member 116 may be disposed to contact the rear surface of the curved liquid crystal display device 100 by bending the connecting member 116 even when the connecting member 116 has a relatively short length.

As a result, although a thickness of the curved liquid crystal display device 100 having a direct type backlight unit 120 (of FIG. 2) is greater than a thickness of a curved liquid crystal display device (not shown) having an edge type backlight unit, the connecting member 116, which connects the liquid crystal panel 110 and the printed circuit board (PCB) 117, may be used for both the curved liquid crystal display device 100 having a direct type backlight unit 120 and the curved liquid crystal display device having an edge type backlight unit. Thus, fabrication cost may be reduced and fabrication efficiency may be improved.

As shown in FIG. 4, the backlight unit 120 is composed of the reflective plate 125 having the through-holes 125h defined therein, the light source module including the PCB 129b and the plurality of lenses 129a arranged on the PCB 129b and spaced from each other, wherein the lens 129a extends through the through-hole 125h, and the diffuser plate 123 and the optical sheets 121 stacked on the light source module 129.

The liquid crystal panel 110 is disposed over the backlight unit 120. The liquid crystal panel 110 includes the first and second substrates 112 and 114 and the liquid crystal layer (not shown) between the first and second substrates 112 and 114, and the upper and lower polarizing plates 119a and 119b for selectively transmitting a predetermined polarized light are formed on the outer surfaces of the upper and lower substrates 112 and 114, respectively.

The backlight unit 120 and the liquid crystal panel 110 are modularized with each other using the curved guide panel 130, the curved top cover 140, the cover bottom 150, the optical guide frame 160 and the reinforcing frame 200.

The light source module 129 is disposed on the cover bottom 150, and the reflective plate 125 is disposed on the light source module 129 such that the plurality of lens 129a respectively containing the LEDs therein are exposed through the plurality of through holes 125h and the PCB 129b is covered with the reflective plate 125.

The diffuser plate 123 is disposed over the light source module 129 and the reflective plate 125. The diffuser plate 123 is supported by the guide supporter 127 to be spaced apart from the light source module 129 and the reflective plate 125. The optical sheets 121 are disposed over the diffuser plate 123 and the edge portion of the optical sheets 121 is surrounded by the optical guide frame 160.

The side surface of the backlight unit 120 including the light source module 129, the reflective plate 125, the diffuser plate 123 and the optical sheets 121 is surrounded by the first main portion 131 of the curved guide panel 130, and the rear edge surface of the liquid crystal panel 110 is supported by the second main portion 133 such that the liquid crystal panel 110 is disposed over the optical sheets 121.

The front edge surface and the side surface of the liquid crystal panel 110 are surrounded by the curved top cover 140. The curved top cover 140 and the curved guide panel 130 are assembled and combined with each other such that an inner surface of the first top portion 141 of the curved top cover 140 contacts an outer surface of the first main portion 131 of the curved guide panel 130.

The pair of curved reinforcing bars 210 of the reinforcing frame 200 constitute side surfaces of the cover bottom 150 such that the first vertical portions 211 of the pair of the reinforcing bars 210 are disposed along both the long sides of the cover bottom 150, and the cover bottom 150 is disposed on and supported by the second horizontal portions 217 of the pair of curved reinforcing bars 210. The cover bottom 150 and the pair of curved reinforcing bars 210 are assembled and combined with each other such that the rear surface of the cover bottom 150 contacts the front surface of the second horizontal portions 217 of the pair of curved reinforcing bars 210. In addition, the curved guide panel 130 and the pair of curved reinforcing bars 210 are assembled and combined with each other such that an outer surface of the first vertical portions 211 of the pair of curved reinforcing bars 210 contact an inner surface of the first main portion 131 of the curved guide panel 130.

Thus, the cover bottom 150 is assembled and combined with the pair of curved reinforcing bars 210 of the reinforcing frame 200, and the pair of curved reinforcing bars 210 of the reinforcing frame 200 are assembled and combined with the curved guide panel 130. Further, the curved guide panel 130 surrounding the optical guide frame 160 is assembled and combined with the curved top cover 140. Accordingly, the liquid crystal panel 110 and the backlight unit 120 are modularized and integrated with each other by the curved guide panel 130, the curved top cover 140, the cover bottom 150, the optical guide frame 160 and the reinforcing frame 200.

In this regard, the guide portion 219 having a concave shape where an edge is removed may be formed on the top surface of the first vertical portion 211 of the curved reinforcing bar 210 to support the edge portion of the diffuser plate 123.

The printed circuit board (PCB) 117 that is connected to the liquid crystal panel 110 through the connecting member 116 may contact the rear surface of one of the pair of curved reinforcing bars 210 by bending the connecting member 116. The pair of curved reinforcing bars 210 have a stepped shape such that the rear surface of the first horizontal portion 213 and the outer side surface of the second vertical portion 215 constitute the step, and the printed circuit board (PCB) 117 is inserted into the space created by the step to contact the rear surface of the curved reinforcing bar 210 by bending the connecting member 116.

Accordingly, the printed circuit board (PCB) 117 that is connected to the liquid crystal panel 110 through the connecting member 116 may be disposed to contact the rear surface of the curved reinforcing bar 210 of the curved liquid crystal display device 100 by bending the connecting member 116 even when the connecting member 116 has a relatively short length.

As a result, although a thickness of the curved liquid crystal display device 100 having a direct type backlight unit 120 (of FIG. 2) is greater than a thickness of a curved liquid crystal display device having an edge type backlight unit (not shown), the connecting member 116, which connects the liquid crystal panel 110 and the printed circuit board (PCB) 117, may be used for both the curved liquid crystal display device 100 having a direct type backlight unit 120 and the curved liquid crystal display device having an edge type backlight unit. Thus, fabrication cost may be reduced and fabrication efficiency may be improved.

In addition, since the pair of curved reinforcing bars 210 have a uniform thickness, the reinforcing frame 200 may maintain a whole curvature of the curved liquid crystal display device 100 with a relatively high rigidity.

Moreover, since the pair of curved reinforcing bars 210 have a stepped shape, a light leakage at an edge portion of the liquid crystal panel 110 may be reduced or prevented.

A partial light emitted plurality of lens 129a respectively containing the LEDs therein of the light source module 129 is reflected on the pair of curved reinforcing bars 210 and propagates toward the diffuser plate 123. Since the pair of curved reinforcing bars 210 have vertical reflecting surfaces such as inner surfaces of the first and second vertical portions 211 and 215, the partial light is reflected on the vertical reflecting surface toward a central portion of the diffuser plate 123.

As a result, the partial light is not reflected toward an edge portion of the diffuser plate 123 as compared to the liquid crystal display device according to the related art, and a light leakage at the edge portion may thus be reduced or prevented.

When the pair of curved reinforcing bars 210 are made of aluminum (Al), an additional reflecting member may not be required on the reflecting surface of the pair of reinforcing bars 210. When the pair of reinforcing bars 210 are made of one of stainless steel (SUS), hot dip galvanized iron (HGI) and electrolytically galvanized iron (EGI), a reflecting pad (not shown) of a white color or silver color may be formed on the reflecting surface of the pair of reinforcing bars 210.

Figure 5:
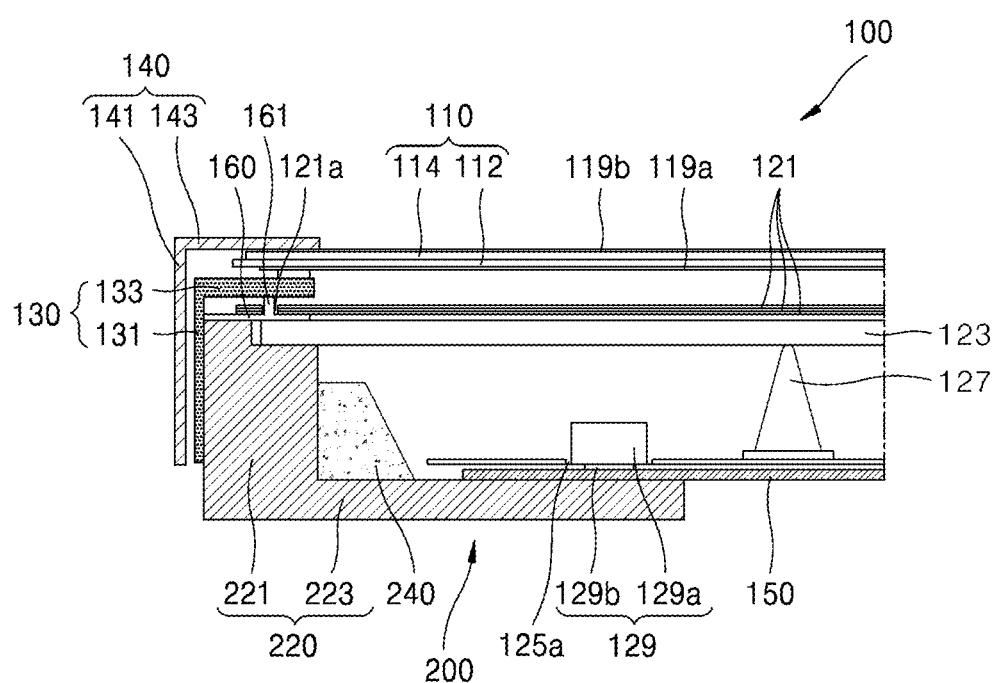
FIG. 5 is a cross-sectional view cut along a cutting line 5-5 in FIG. 2 in the display device according to an embodiment of the present disclosure.

FIG. 5 is a cross-sectional view cut along a cutting line 5-5 in FIG. 2 in the display device according to an embodiment of the present disclosure.

Referring to FIG. 5, in the display device 100 according to an embodiment of the present disclosure, the pair of side frames 220 have a bar shape having a cross-sectional shape of "L." For example, each of the pair of side frames 220 may include a third vertical portion 221 and a third horizontal portion 223 perpendicularly bent from an end of the third vertical portion 221.

The pair of side frames 220 are disposed along both the short sides of the bottom frame 150 and spaced apart from each other such that the third vertical portion 221 constitutes side surfaces of the bottom frame 150. In addition, the bottom frame 150 is disposed and supported by the third horizontal portion 223 of the pair of side frames 220.

In this regard, a side mold 240 is disposed on inner surfaces of the third vertical portion 221 and the third horizontal portion 223 of each side fame 220. As a result, the side frame 220 may have a stepped shape by external surfaces of the third vertical portion 221, the side mold 240 and the third horizontal portion 223 in a cross-sectional view. For reflecting light, the side mold 240 may include a high glossy white material or the side mold 240 may be treated to have a mirror surface. Accordingly, a light leakage along the short sides of the liquid crystal panel 110 may also be reduced or prevented in the curved LCD device 100.

The reinforcement frame 200 in which the backlight unit 120 is accommodated may be made of a metal material such as an aluminum plate, an aluminum alloy plate, or a galvanized steel plate. Depending on an embodiment, the reinforcement frame 200 may be made of a plastic material such as polycarbonate (PC).

The light source module 129 may be accommodated in the reinforcement frame 200. The light source module 129 may include the PCB 129b disposed on the bottom portion 129c on the cover bottom 150, and the plurality of lenses 129a mounted on the PCB 129b.

Each lens 129a may receive a light source therein. The light source may include, for example, a light-emitting diode (LED). Hereinafter, the light source is referred to as the LED. Each lens 129a is mounted on the PCB 129b so that a light-emitting surface of the light source LED faces the display panel 110.

The light source LED may be a colored LED that emits light of at least one color such as red, blue, green, etc., or may be a white LED. Furthermore, the colored LED may include at least one of a red LED, a blue LED, and a green LED. The arrangement of and light emitted from the light source LED may vary in various ways.

The PCB 129b may be in a form of a narrow and elongated bar. The PCB 129b supports the lens 129a thereon and supplies power to the light source LED of the lens 129a. The PCB 129b may be a metal core printed circuit board (MCPCB) that may quickly dissipate heat generated from the light source LED. The light source LED of the lens 129a is electrically connected to a wiring of the PCB 129b and receives power therefrom to convert electrical energy into light energy and emit the light. One or more light sources LED of the lens 129a may be disposed on one PCB 129b. The total number and arrangement of light sources LED may vary depending on a size of the display panel, an output of the light source, etc.

The lens 129a is mounted on the PCB 129b. The lens 129a is an optical lens and is positioned to substantially cover the light source LED. As a result, the light from the light source LED is refracted and diffused through the lens 129a. The lens 129a diffuses upward light from the light source LED so that the light is not concentrated. Thus, using the lens 129a, the number of light sources LED may be reduced, and high-output light may be applied.

The lens 129a may be a side emitting lens that mainly refracts and diffuses upward light coming from the light source LED toward a side surface. In one example, the lens 129a may be a top emitting lens that refracts and diffuses the light from the light source LED mainly in the upward direction. Since the side emitting lens may reduce an optical distance compared to the top emitting lens, the optical sheet 121 may be positioned closer to the light source LED, and an overall thickness of the backlight unit 120 may be reduced accordingly, thereby slimming the display device.

An assembly of the PCB 129b, and the lens 129a containing therein the light source LED mounted on the PCB 129b is referred to as the light source module 129 in the present disclosure. A plurality of light source modules 129 may be arranged on one PCB 129b and spaced from each other by a predetermined spacing. Alternatively, the number of the plurality of light source modules 129 may be the same as the number of PCBs 129b.

The reflective plate 125 may be disposed on the PCB 129b. The through-holes 125h may be formed in the reflective plate 125, so that each of the lenses 129a disposed on the PCB 129b may be inserted into each of the through-holes 125h of the reflective plate 125.

The reflective plate 125 may be made of a plastic material such as polyethylene terephthalate (PET), polycarbonate (PC), or polystyrene (PS). The reflective plate 125 may include a light-reflective material such as titanium dioxide ($TiO_2$) to increase light reflectance.

A space defined by the reflective plate 125 and the diffuser plate 123 may be referred to as an optical space of the backlight unit 120.

Each of the diffuser sheet 121 and the diffuser plate 123 may be referred to as a light enhancement member. The light enhancement member increases the efficiency of light emitted from the light source module 129. The diffuser sheet 121 diffuses the light emitted from the light source module 129 and radiates the diffused light to the optical sheet 121. The optical sheet 121 is located on top of the diffuser plate 123 to increase the efficiency of light incident from the diffuser plate 123.

The diffuser sheet 121 scatters light to create surface light of more uniform brightness. The optical sheet 121 may include a prism sheet to control a travel direction of light spread evenly by the diffuser plate 123 to condense the light to increase luminance, and a protective sheet used to protect a prism of the prism sheet from scratches, etc. The protective sheet may perform a function of spreading the light to widen a viewing angle narrowed by the prism sheet.

The optical sheet 121 may not include any of the prism sheet and the protective sheet, and may include a plurality of optical sheets 121. The optical sheet 121 may further include optical sheets having other characteristics. For example, the optical sheet 121 may include a reflective polarizing sheet that may separate polarized components of light from each other and transmit and reflect the polarized components therethrough and therefrom, respectively to increase luminance efficiency.

In one example, although (not shown), an inverter board as a printed circuit board for power supply, and/or a printed circuit board for signal conversion may be mounted on a lower surface of the cover bottom 150. The inverter board may convert external power to power having a certain voltage level and provide the latter to the light source LED. The printed circuit board for signal conversion may convert an analog data signal into a digital data signal and provide the latter to the display panel 110 through the flexible circuit board (not shown) attached to the display panel 110.

The display device 100 may include the curved guide panel 130 to stably fix the display panel 110 to the curved backlight unit 120 at a certain vertical level.

The curved guide panel 130 may have a substantially rectangular frame shape of a cuboid having an open top and an open bottom. The curved guide panel 130 may be coupled to the reinforcement frame 200 in a hooked manner to a hook (not shown) that may be positioned on a sidewall of the reinforcement frame 200 while surrounding the sidewall of the reinforcement frame 200. In this regard, the curved guide panel 130 may be curved concavely at the same curvature as that of the upper surface 129t of each of the first sidewall and the second sidewall.

The display panel 110 is disposed on and fixed to the curved guide panel 130. The display panel 110 may be attached to an upper surface of the curved guide panel 130 through an adhesive member (not shown). The adhesive member may be embodied as a cushion double-sided tape having a shock absorbing ability to alleviate the impact that may be applied to the display panel 110.

The curved top cover 140 may be installed to cover the edge of the upper surface and the side surface of the display panel 110. The curved guide panel 130 and the curved top cover 140 may be omitted depending on an embodiment.

Figure 6:
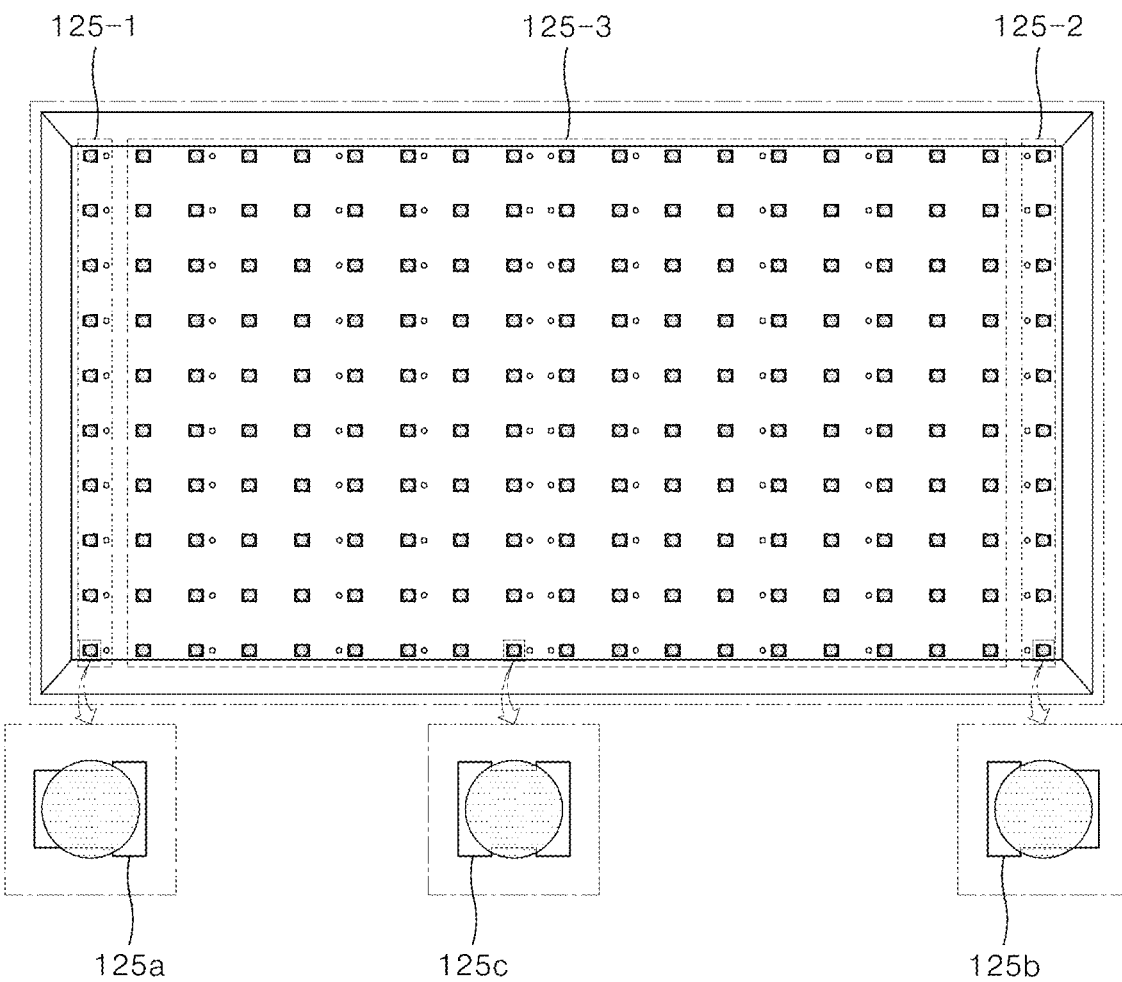
FIG. 6 is a diagram showing a reflective plate according to an embodiment of the present disclosure.

FIG. 6 is a diagram showing a reflective plate according to an embodiment of the present disclosure.

Referring to FIG. 6, the reflective plate 125 according to an embodiment of the present disclosure may include a first area 125-1 located at a left edge, a second area 125-2 located at a right edge, and a third area 125-3 corresponding to a remaining area other than the first and second areas.

In the first area 125-1 of the reflective plate 125, at least two first opening 125a of the same shape are formed and arranged so as to be spaced from each other by an equal spacing in a column direction. The first openings 125a extend through the reflective plate 125. In a plan view, a dimension in the column direction of a left edge of the first opening is smaller than a dimension in the column direction of each of a right edge and a middle portion thereof. This structure of the first opening 125a is to prevent or at least reduce the reflective plate 125 from being torn when the reflective plate 125 expands or shrinks in left and right directions around a center thereof when the surrounding environment of the display device 100 has high temperature and high humidity. Accordingly, even when the display device 100 is present under the high temperature and high humidity environment and thus the reflective plate 125 shrinks or expands, the coupling between the reflective plate 125 and the lenses 129a may be maintained. Therefore, the defect in the display device 100 in which the lenses 129a are removed from the reflective plate 125 may be prevented even in high temperature and high humidity environments.

In the second area 125-2 of the reflective plate 125, at least two second opening 125b of the same shape are formed and arranged so as to be spaced from each other by an equal spacing in a column direction. The second openings 125b extend through the reflective plate 125. In a plan view, a dimension in the column direction of a right edge of the second opening is smaller than a dimension in the column direction of each of a left edge and a middle portion thereof. This structure of the second opening 125b is to prevent or at least reduce the reflective plate 125 from being torn when the reflective plate 125 expands or shrinks in left and right directions around a center thereof when the surrounding environment of the display device 100 has high temperature and high humidity. Accordingly, even when the display device 100 is present under the high temperature and high humidity environment and thus the reflective plate 125 shrinks or expands, the coupling between the reflective plate 125 and the lenses 129a may be maintained. Therefore, the defect in the display device 100 in which the lenses 129a are removed from the reflective plate 125 may be prevented even in high temperature and high humidity environments.

In the third area 125-3 of the reflective plate 125, at least two third opening 125c of the same shape are formed and arranged so as to be spaced from each other by an equal spacing in a column direction. The third openings 125c extend through the reflective plate 125. In a plan view, a dimension in the column direction of each of right and left edges of the third opening is larger than a dimension in the column direction of a middle portion thereof. Due to the structure of the third opening 125c, in the opening area, the middle portion of the reflective plate protrudes into the third opening. Thus, when the lens 129a is inserted into the third opening 125c, the protruding portion acts as a stopper such that the lens may be prevented from the third opening.

Figure 7:
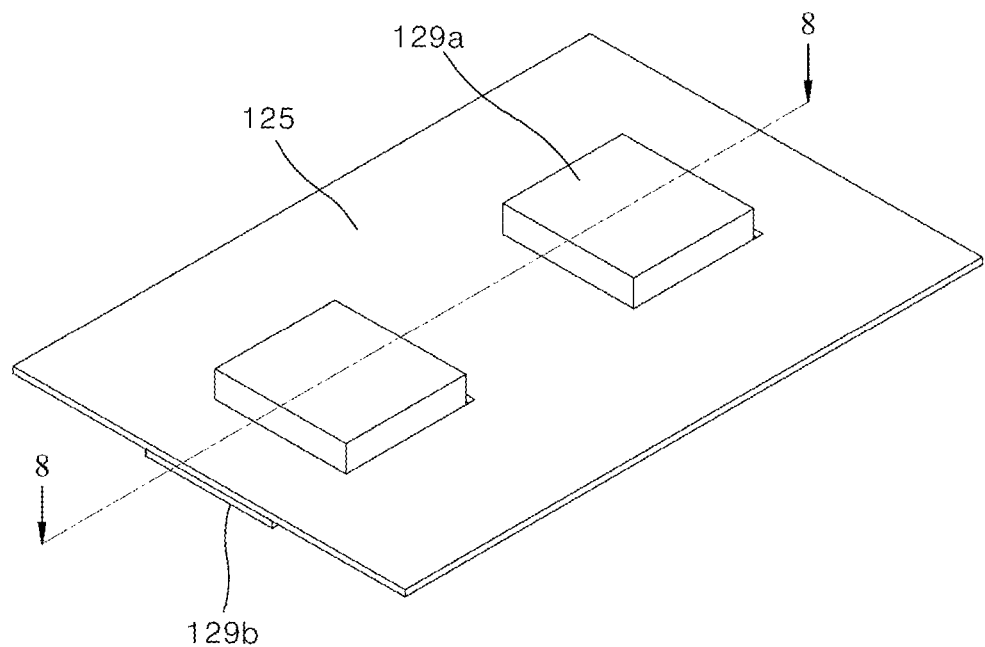
FIG. 7 is a diagram showing a basic structure of a backlight unit according to an embodiment of the present disclosure.
Figure 8:
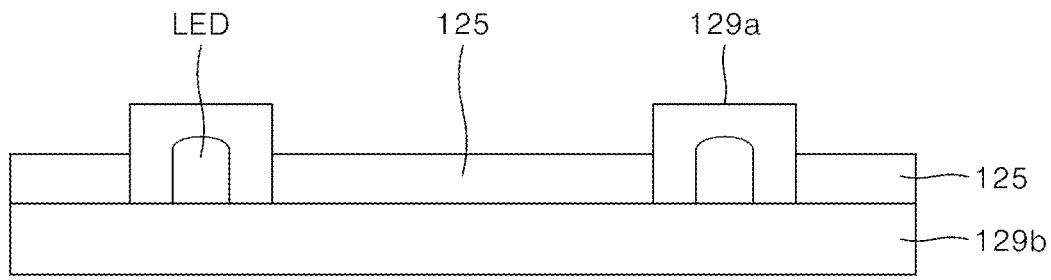
FIG. 8 is a cross-sectional view cut along a cutting line 8-8 in FIG. 7 in the backlight unit according to an embodiment of the present disclosure.
Figure 9A:
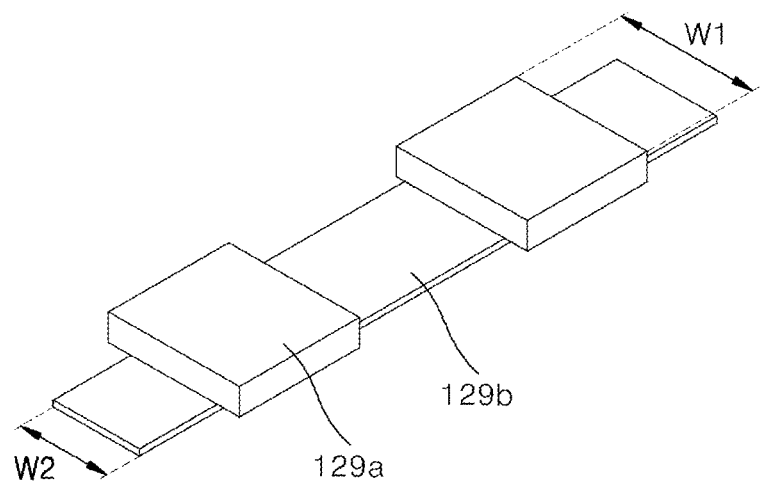
FIG. 9A is a diagram showing an example in which a lens is disposed on a PCB according to an embodiment of the present disclosure.
Figure 9B:
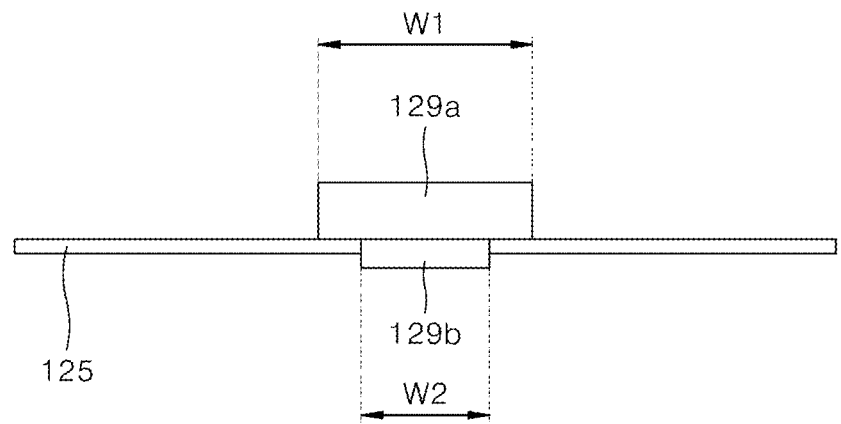
FIG. 9B is a cross-sectional view comparing a width of a PCB and a width of a lens with each other according to an embodiment of the present disclosure.

FIG. 7 is a drawing showing a basic structure of a backlight unit according to an embodiment of the present disclosure, and FIG. 8 is a cross-sectional view cut along a cutting line 8-8 in FIG. 7 of the backlight unit according to an embodiment of the present disclosure. FIG. 9A is a drawing showing an example in which a lens is disposed on a PCB according to an embodiment of the present disclosure, and FIG. 9B is a cross-sectional view comparing a width of the PCB and a width of the lens with each other according to an embodiment of the present disclosure.

Referring to FIG. 7 and FIG. 8, the backlight unit 120 according to an embodiment of the present disclosure may include the printed circuit board (PCB) 129b, at least one lens 129a, and the reflective plate 125.

The at least one lens 129a may be disposed on the PCB 129b.

The reflective plate 125 may be formed to have the openings 125a, 125b, and 125c defined therein corresponding to the lenses 129a, and may be disposed on the PCB 129b so that each lens 129a is inserted into each of the openings 125a, 125b, and 125c.

The reflective plate 125 has the first opening 125a located in one side edge thereof, the second opening 125b located in the other side edge thereof, and at least one third opening 125c located between the first opening 125a and the second opening 125b. The third openings 125c may be spaced from each other by an equal spacing.

In a plan view, a dimension in the column direction of a left edge of the first opening 125a is smaller than a dimension in the column direction of each of a right edge and a middle portion thereof. In a plan view, a dimension in the column direction of a right edge of the second opening 125b is smaller than a dimension in the column direction of each of a left edge and a middle portion thereof. In a plan view, a dimension in the column direction of each of right and left edges of the third opening 125c is larger than a dimension in the column direction of a middle portion thereof.

The first openings 125a may be formed in the first area (left edge area) 125-1 of the reflective plate 125, and be arranged in the column direction and may be spaced apart from each other by an equal spacing, and may extend through the reflective plate 125. In a plan view, a dimension in the column direction of the left edge of each of the first openings 125a is smaller than a dimension in the column direction of each of the right edge and the middle portion thereof.

The second openings 125b may be formed in the second area (right edge area) 125-2 of the reflective plate 125, and be arranged in the column direction and may be spaced apart from each other by an equal spacing, and may extend through the reflective plate 125. In a plan view, a dimension in the column direction of the right edge of each of the second openings 125b is smaller than a dimension in the column direction of each of the left edge and the middle portion thereof.

The third openings 125c may be formed in the third area (middle area) 125-3 of the reflective plate 125, and be arranged in the column and row directions and may be spaced apart from each other by an equal spacing, and may extend through the reflective plate 125. In a plan view, a dimension in the column direction of each of right and left edges of the third opening 125c is larger than a dimension in the column direction of a middle portion thereof.

The first opening 125a, the second opening 125b, and the third opening 125c may have different shapes from each other. For example, each of the first openings 125a may have a shape  in which in a plan view, a dimension in the column direction of the left edge of each of the first openings 125a is smaller than a dimension in the column direction of each of the right edge and the middle portion thereof. Each of the second openings 125b may have a shape  in which in a plan view, a dimension in the column direction of the right edge of each of the second openings 125b is smaller than a dimension in the column direction of each of the left edge and the middle portion thereof. Each of the third openings 125c may have a shape in  which in a plan view, a dimension in the column direction of each of right and left edges of the third opening 125c is larger than a dimension in the column direction of a middle portion thereof.

In the plan view, the first opening 125a and the second opening 125b have shapes that are symmetrical to each other with respect to an imaginary vertical line passing through the center in the row direction of the reflective plate 125.

As shown in FIG. 9A, each of the lenses 129a may be arranged so as to be spaced from each other by an equal spacing along the row direction while being disposed on the PCB 129b.

In this regard, a width W1 in the column of each of at least one lens 129a may be greater than a width W2 in the column direction of the PCB 129b.

As shown in FIG. 8, each lens 129a may receive therein each light-emitting diode LED as a light source.

The backlight unit 120 may further include the reinforcing frame 200 that accommodates therein the reflective plate 125 into which the at least one lens 129a disposed on the PCB 129b is inserted.

Furthermore, the backlight unit 120 may include the diffuser plate 123 disposed on the reflective plate 125, and the at least one optical sheet 121 disposed on the diffuser plate 123.

In the display device 100 according to an embodiment of the present disclosure, the display panel 110 may be disposed on the backlight unit 120 having the above-described structure.

The backlight unit 120 may further include the reinforcing frame 200 that accommodates therein the reflective plate 125 into which the at least one lens 129a disposed on the PCB 129b is inserted. The reinforcement frame 200 may include four side walls coupled to each other to define an accommodation space of a rectangular shape in a plan view of the display device 100, wherein the four side walls extend upwardly and respectively from four side edges of a bottom surface of the reinforcement frame 200.

In one embodiment, a height from the bottom surface of each of the first sidewall and the second sidewall facing each other is larger in each of both opposing side edges thereof than in a center thereof, wherein a lower surface of each of the first and second sidewalls is curved to have a first curvature having a value greater than 0, wherein an upper surface of each of the first and second sidewalls is curved to have a second curvature greater than the first curvature.

Figure 10A:
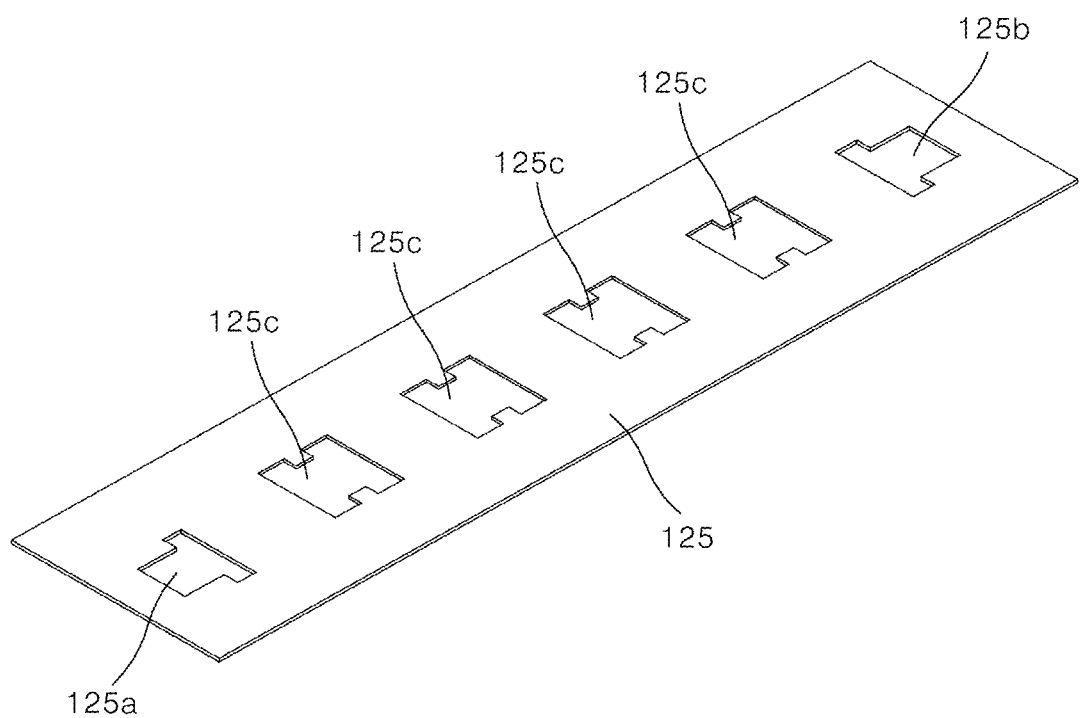
FIG. 10A and FIG. 10B are diagrams showing an example in which first to third openings are formed in a reflective plate according to an embodiment of the present disclosure.
Figure 10B:
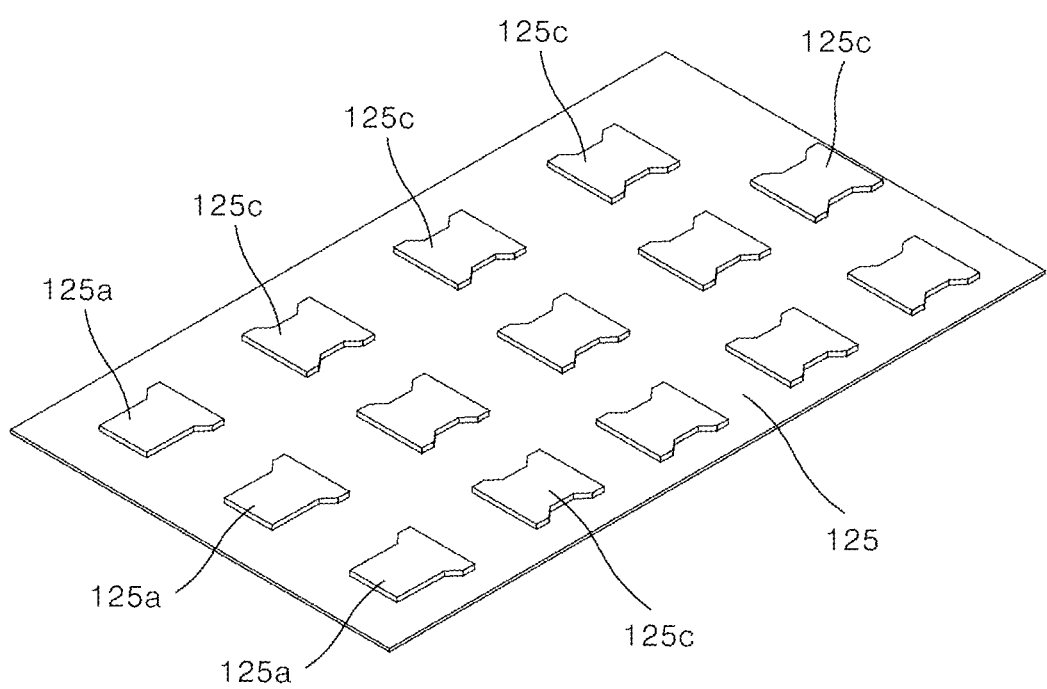
Figure 11:
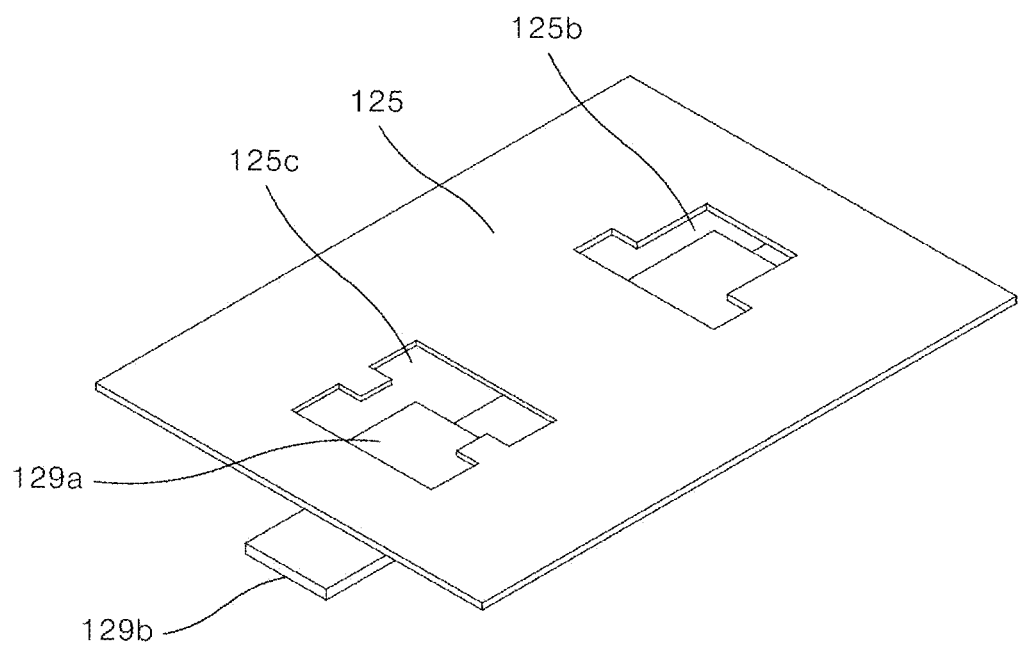
FIG. 11 is a diagram showing an example in which a lens on a PCB is inserted into a reflective plate is inserted according to an embodiment of the present disclosure.
Figure 12:
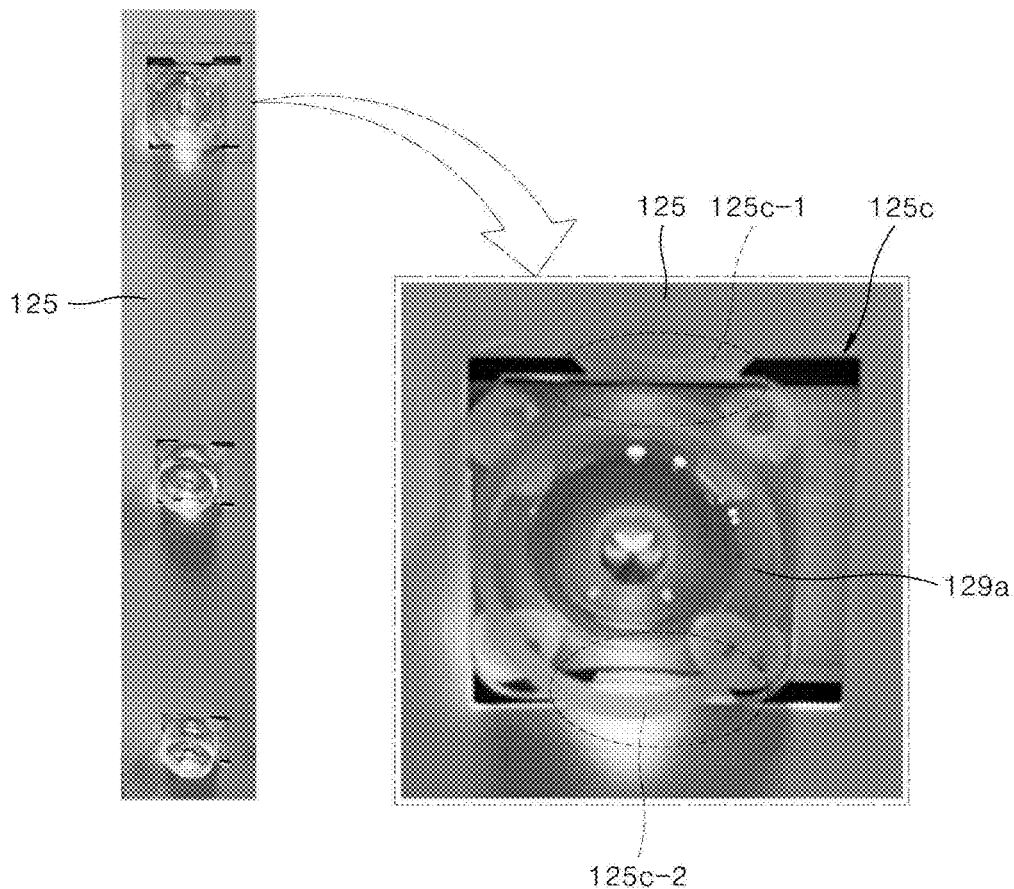
FIG. 12 is a diagram showing an example in which a lens is inserted into a third opening defined in a reflective plate according to an embodiment of the present disclosure.
Figure 13:
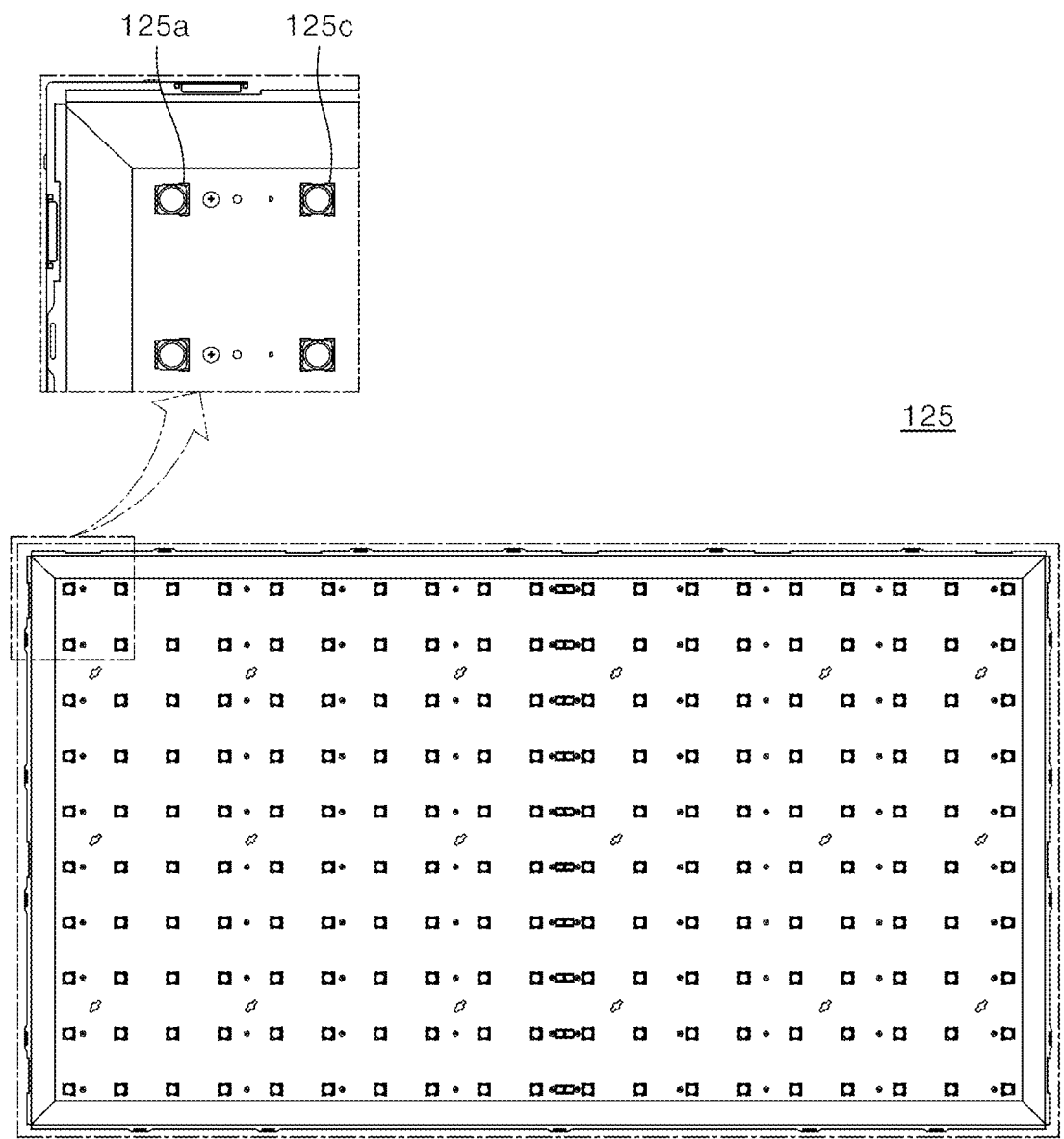
FIG. 13 is a diagram showing an example in which a lens is inserted into each of openings defined in one side edge of a reflective plate according to an embodiment of the present disclosure.

FIG. 10A and FIG. 10B are diagrams showing an example in which first to third openings are formed in a reflective plate according to an embodiment of the present disclosure. FIG. 11 is a diagram showing an example in which a lens on a PCB is inserted into a reflective plate is inserted according to an embodiment of the present disclosure. FIG. 12 is a diagram showing an example in which a lens is inserted into a third opening defined in a reflective plate according to an embodiment of the present disclosure. FIG. 13 is a diagram showing an example in which a lens is inserted into each of openings defined in one side edge of a reflective plate according to an embodiment of the present disclosure.

Referring to FIG. 10A and FIG. 10B, the reflective plate 125 according to an embodiment of the present disclosure may have at least one first opening 125*a*, the second opening 125*b*, and the third opening 125*c* defined so as to extend through the reflective plate 125.

Each of the first openings 125*a* may have a shape  in which in a plan view, a dimension in the column direction of the left edge of each of the first openings 125*a* is smaller than a dimension in the column direction of each of the right edge and the middle portion thereof.

Each of the second openings 125*b* may have a shape  in which in a plan view, a dimension in the column direction of the right edge of each of the second openings 125*b* is smaller than a dimension in the column direction of each of the left edge and the middle portion thereof.

Each of the third openings 125*c* may have a shape  in which in a plan view, a dimension in the column direction of each of right and left edges of the third opening 125*c* is larger than a dimension in the column direction of a middle portion thereof.

Referring to FIG. 11, the reflective plate 125 according to an embodiment of the present disclosure has the second opening 125*b* located at the right edge and the third opening 125*c* adjacent thereto. Each of the lenses 129*a* on each PCB 129*b* may be fixedly inserted into each of the second opening 125*b* and the third opening 125*c*.

Referring to FIG. 12, the reflective plate 125 defining the third opening 125*c* may have a first protrusion 125*c*-1 protruding into the third opening 125*c* from one of both opposing sides in the second direction of the third opening 125*c* in a middle area in the first direction of the third opening; and a second protrusion 125*c*-2 protruding into the third opening 125*c* from the other of the both opposing sides in the second direction of the third opening in the middle area in the first direction of the third opening 125*c*.

Accordingly, each lens 129*a* inserted into the third opening 125*c* of the reflective plate 125 may not be removed from the third opening 125*c* due to the first protrusion 125*c*-1 and the second protrusion 125*c*-2 acting as the stopper and thus may be fixedly received therein.

Referring to FIG. 13, the lenses may be respectively inserted into the first opening 125*a* located at the upper left edge and the third opening 125*c* located in the middle area of the reflective plate 125 according to an embodiment of the present disclosure.

In this regard, the lens inserted into the first opening 125*a* may be firmly fixed into the first opening 125*a* which may have a shape  in which in a plan view, a dimension in the column direction of the left edge of each of the first openings 125*a* is smaller than a dimension in the column direction of each of the right edge and the middle portion thereof. In this regard, the reflective plate 125 may expand or shrink in both opposing sides (left and right sides) around the center thereof under the high temperature or high temperature and high humidity environment. Thus, when the reflective plate 125 shrinks, it may be torn. When the reflective plate expands, the first opening 125*a* expands such that the lens 129*a* may be removed from the first opening 125*a*. Therefore, in consideration of this phenomenon, the first opening 125*a* may have a shape  in which in a plan view, a dimension in the column direction of the left edge of each of the first openings 125*a* is smaller than a dimension in the column direction of each of the right edge and the middle portion thereof. The shape of the first opening 125*a* is different from that of the third opening 125*c* located in the middle area. Due to the first opening 125*a* having the shape in a plan view, a dimension in the column direction of the left edge of each of the first openings 125*a* is smaller than a dimension in the column direction of each of the right edge and the middle portion thereof, the lens 129*a* may not be removed from the first opening 125*a* and may be firmly fixed therein even when the reflective plate 125 shrinks or expands under the high temperature or high temperature and high humidity environment.

In one example, when the display panel 110 is curved around the center thereof, the reflective plate 125 is curved around the center thereof. For this reason, each of the third openings 125*c* may have a shape  in which in a plan view, a dimension in the column direction of each of right and left edges of the third opening 125*c* is larger than a dimension in the column direction of a middle portion thereof.

Figure 14:
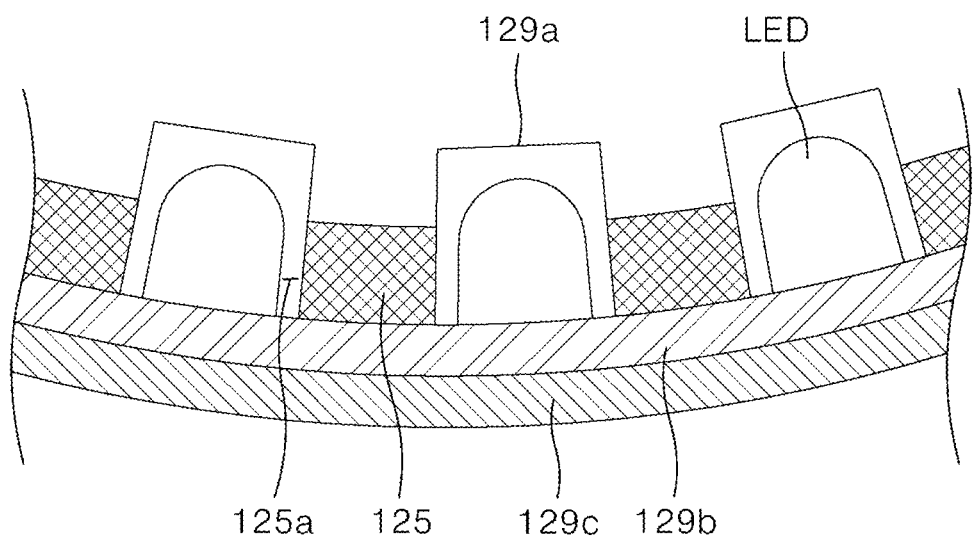
FIG. 14 is a cross-sectional view showing a state in which a lens is inserted into the third opening of the reflective plate according to an embodiment of the present disclosure.

FIG. 14 is a cross-sectional view showing a state in which a lens is inserted into the third opening of the reflective plate according to an embodiment of the present disclosure.

Referring to FIG. 14, the reflective plate 125 according to an embodiment of the present disclosure may be disposed on a top of the PCB 129*b* disposed on the bottom portion 129*c*.

In this regard, the lenses 129*a* respectively receiving therein the light sources LED may be arranged so as to be spaced from each other by an equal spacing while being disposed on the PCB 129*b*.

The third openings 125*c* extending through the reflective plate 125 may be arranged so as to be spaced from each other by an equal spacing.

Therefore, when the reflective plate 125 is disposed on the PCB 129*b*, each lens 129*a* is inserted into each third opening 125*c*.

In this regard, each lens 129*a* inserted into the third opening 125*c* is not removed from the third opening 125*c* and is fixedly received therein due to the first protrusion 125*c*-1 and the second protrusion 125*c*-2 protruding into the third opening 125*c* and acting as the stopper.

As described above, according to an embodiment of the present disclosure, the backlight unit may be provided in which the PCB and the lens are prevented from lifting off from the edge of the reflective plate and are fixed to the reflective plate when manufacturing an LED array. Further, the display device including the same may be provided.

Further, the backlight unit may be provided in which the lenes disposed on the PCB and arranged so as to be spaced from each other are fixedly inserted into openings defined in the reflective plate, wherein the openings defined in different areas of the reflective plate have different shapes and widths. Further, the display device including the same may be provided.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A backlight unit comprising:
    a printed circuit board;
    at least one lens on the printed circuit board; and
    a reflective plate having at least one opening that corresponds to the at least one lens, wherein the reflective plate is on the printed circuit board such that the at least one lens is inserted into the at least one opening,
    wherein the at least one opening includes:
        a first opening at a first side edge of both opposing side edges in a first direction of the reflective plate;
        a second opening located at a second side edge of the both opposing side edges in the first direction of the reflective plate; and
        at least one third opening located between the first opening and the second opening,
        wherein the reflective plate includes two protrusions that protrude and face each other within the at least one third opening.

2. The backlight unit of claim 1, wherein in a plan view of the backlight unit, each of the first opening, the second opening, and the at least one third opening has a first side edge portion, a second side edge portion, and a middle portion between the first side edge portion and the second side edge portion,
    wherein a width in a second direction of the first side edge portion of the first opening is smaller than a width in a second direction of each of the second side edge portion and the middle portion of the first opening, wherein the second direction intersects with the first direction,
    wherein a width in the second direction of the second side edge portion of the second opening is smaller than a width in the second direction of each of the first side edge portion and the middle portion of the second opening,
    wherein a width in the second direction of the middle portion of the at least one third opening is smaller than a width in the second direction of each of the first side edge portion and the second side edge portion of the at least one third opening.

3. The backlight unit of claim 2, wherein the first side edge of the reflective plate is a left side edge of the reflective plate, and the second side edge of the reflective plate is a right side edge of the reflective plate.

4. The backlight unit of claim 1, wherein in a plan view of the backlight unit, the first opening, the second opening, and the at least one third opening have different shapes from each other.

5. The backlight unit of claim 1, wherein in a plan view of the backlight unit, the first opening and the second opening have shapes that are symmetrical to each other with respect to an imaginary vertical line through a center in the first direction of the reflective plate.

6. The backlight unit of claim 1, wherein each of the at least one lens is on the printed circuit board and are arranged so as to be spaced from each other by an equal spacing along the first direction.

7. The backlight unit of claim 1, wherein a width in a second direction of each of the at least one lens is larger than a width in the second direction of the printed circuit board, wherein the second direction intersects the first direction.

8. The backlight unit of claim 1, wherein each of the at least one lens receives therein each a light-emitting diode.

9. The backlight unit of claim 1, further comprising:
    a reinforcement frame accommodating therein the reflective plate into which the at least one lens on the printed circuit board is inserted.

10. The backlight unit of claim 1, wherein a diffuser sheet is on the reflective plate,
    wherein at least one optical sheet is on the diffuser sheet.

11. A display device comprising:
    the backlight unit according to claim 1; and
    a display panel disposed on the backlight unit.

12. The display device of claim 11, wherein the backlight unit further includes a reinforcement frame accommodating therein the reflective plate into which the at least one lens on the printed circuit board is inserted,
    wherein the reinforcement frame includes four side walls coupled to each other to define an accommodation space of a rectangular shape in a plan view of the display device, wherein the four side walls extend upwardly and respectively from four side edges of a bottom surface of the reinforcement frame.

13. The display device of claim 12, wherein a height from the bottom surface of each of a first sidewall and a second sidewall facing each other is larger in each of both opposing side edges thereof than in a center thereof,
    wherein a lower surface of each of the first sidewall and the second sidewall is curved to have a first curvature having a value greater than 0,
    wherein an upper surface of each of the first sidewall and the second sidewall is curved to have a second curvature greater than the first curvature.

14. The display device of claim 11, wherein the reflective plate includes:
    a first protrusion protruding into the at least one third opening from one of both opposing sides in the second direction of the third opening in a middle area in the first direction of the third opening; and
    a second protrusion protruding into the third opening from the other of the both opposing sides in the second direction of the third opening in the middle area in the first direction of the third opening.

15. The display device of claim 11, further comprising:
    at least one curved reinforcing bar of a step structure supporting the backlight unit.

16. The display device of claim 15, wherein the at least one curved reinforcing bar includes:
    a first vertical portion;
    a first horizontal portion vertically bent from one end of the first vertical portion;

a second vertical portion vertically bent from one end of the first horizontal portion; and a second horizontal portion vertically bent from one end of the second vertical portion.

17. The display device of claim 16, wherein a back surface of the second horizontal portion and an outer surface of the second vertical portion form the step structure, and a printed circuit board connected to the display panel is fixed to the step structure.

* * * * *